United States Patent
Riou et al.

(10) Patent No.: US 9,505,917 B2
(45) Date of Patent: Nov. 29, 2016

(54) TIRE INNER LINER

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Isabelle Riou, Clermont-Ferrand (FR); Aline Riou, Clermont-ferrand (FR); Jean-Luc Cabioch, Clermont-ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/435,803

(22) PCT Filed: Oct. 10, 2013

(86) PCT No.: PCT/EP2013/071189
§ 371 (c)(1),
(2) Date: Apr. 15, 2015

(87) PCT Pub. No.: WO2014/060287
PCT Pub. Date: Apr. 24, 2014

(65) Prior Publication Data
US 2015/0284548 A1    Oct. 8, 2015

(30) Foreign Application Priority Data

Oct. 15, 2012 (FR) ..................... 12 59790

(51) Int. Cl.
| | |
|---|---|
| C08K 3/04 | (2006.01) |
| C08L 9/06 | (2006.01) |
| C08L 21/00 | (2006.01) |
| C08L 53/02 | (2006.01) |

(52) U.S. Cl.
CPC .................. *C08L 9/06* (2013.01); *C08L 21/00* (2013.01); *C08L 53/02* (2013.01); *C08L 2205/05* (2013.01)

(58) Field of Classification Search
CPC .............................. C08L 9/06; C08L 2205/05
USPC .......................................................... 524/495
See application file for complete search history.

(56) References Cited

U.S. PATENT DOCUMENTS

| | | | |
|---|---|---|---|
| 8,088,861 B2 * | 1/2012 | Joseph | .................. B60C 1/0008 152/510 |
| 2007/0161735 A1 | 7/2007 | Bergman | |
| 2010/0227968 A1 | 9/2010 | Joseph et al. | |

FOREIGN PATENT DOCUMENTS

| | | |
|---|---|---|
| WO | 2006/047509 | 5/2006 |
| WO | 2008/145314 | 12/2008 |

OTHER PUBLICATIONS

International Search Report for Application No. PCT/EP2013/071189 dated Nov. 13, 2013.

* cited by examiner

*Primary Examiner* — Hu Chin
(74) *Attorney, Agent, or Firm* — Dickinson Wright PLLC

(57) ABSTRACT

A tire, the inner liner of which comprises a rubber composition based on at least predominantly a highly unsaturated diene elastomer, a reinforcing organic filler, graphite, chalk, a plasticizing hydrocarbon resin, the glass transition temperature, Tg, of which is greater than 20° C. and the softening point of which is less than 170° C. The use of such a composition in the inner liner of the tire, including graphite and a non-reinforcing filler of chalk type, makes it possible to notably improve the airtightness properties with respect to a control composition which comprises only graphite and which already performs very well in this aspect, but also with respect to a control composition conventionally used in the inner liners of tires, while maintaining a good level of the stiffness and processability properties as the conventional control compositions.

25 Claims, No Drawings

TIRE INNER LINER

This application is a 371 national phase entry of PCT/EP2013/071189, filed 10 Oct. 2013, which claims benefit of French Patent Application No. 1259790, filed 15 Oct. 2012, the entire contents of which are incorporated herein by reference for all purposes.

BACKGROUND

1. Field

The present disclosure relates to a rubber composition for the manufacture of an air-impermeable tire inner layer, commonly known as a tire "inner liner".

2. Description of Related Art

Tubeless tires have an inner surface of low air permeability so as to prevent the tire from deflating and to protect the sensitive internal regions of said tire from the ingress of oxygen and water, such as the plies containing oxidation-sensitive metal cords, this protectio, improving the endurance of the tire. At the present time, such protection of the inner surface of tires is generally achieved by inner liners consisting of elastomeric compositions based on butyl rubber. However, the air impermeability performance of butyl rubbers is linked to a not inconsiderable minimum thickness (of the order of a millimetre) and therefore to a certain weight, which does not make it possible to efficiently meet these new requirements.

Thus, it is necessary to add reinforcing fillers, such as carbon black, to the elastomeric inner liner composition in order to improve its impermeability. However, in large quantities, these reinforcing fillers impair certain properties of the composition both in the uncured state: difficulty in processing the uncured composition, commonly referred to as a "processability" difficulty, and in the cured state: degradation of mechanical properties, especially reduction in the flexural strength. The introduction of plasticizers of the oil type makes it possible to overcome these processing and mechanical property aspects but is highly detrimental to the impermeability of the inner liner.

Various solutions have been envisaged for overcoming these drawbacks, in particular by using other types of fillers, often known as smectites, to be added to the reinforcing fillers. These organophilic smectites improve the impermeability properties of the materials if they are well dispersed in the material.

The publication WO 2006/047509 by the Applicant describes a composition for a tire inner liner, the composition of which, based on predominantly diene rubber and comprising carbon black, comprises non-reinforcing fillers consisting of organophilic smectites that reduce the permeability to gases, dispersed in the elastomeric matrix and also a specific plasticizer consisting of a terpene resin having in particular a glass transition temperature Tg of greater than 50° C. This composition effectively exhibits mechanical and impermeability properties which render it acceptable for use as a tire inner liner, by virtue of the combined effect of these organophilic smectites and this high Tg resin.

Application WO 2008/145314 describes a rubber composition for a tire inner liner based on at least a butyl rubber, a reinforcing filler, graphite and a plasticizing hydrocarbon resin, which possesses processability and flexural strength properties that are as good as the compositions from the prior art, and improved gas impermeability properties, and which also makes it possible to significantly improve the rolling resistance and endurance properties.

SUMMARY

The Applicant has continued these research studies and has discovered, surprisingly, a rubber composition for a tire inner liner based on at least predominantly a highly diene elastomer, a reinforcing organic filler, graphite, chalk, and a plasticizing hydrocarbon resin, the glass transition temperature, Tg, of which is greater than 20° C. and the softening point of which is less than 170° C., which possesses improved gas impermeability properties with respect to the aforementioned solutions, while retaining good processability and mechanical properties with respect to the compositions from the prior art.

The tires of an embodiment of the invention are particularly intended to equip motor vehicles of passenger type, including two-wheel vehicles (in particular motorcycles), 4×4 (four-wheel drive) vehicles and SUV ("Sport Utility Vehicles") vehicles, and also industrial vehicles selected in particular from vans and heavy vehicles such as buses, heavy road transport vehicles such as lorries such as agricultural or civil engineering vehicles.

DETAILED DESCRIPTION OF SPECIFIC EMBODIMENTS

The embodiments and aspects of the invention and also the advantages thereof will be readily understood in light of the description and exemplary embodiments that follow.

I—Measurements and Tests

The rubber compositions are characterized, before and after curing, as indicated below.

I.1—Mooney Plasticity

Use is made of an oscillating consistometer as described in French standard NF T 43-005 (1991). The Mooney plasticity measurement is carried out according to the following principle: the composition in the uncured state (i.e. before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney units" (MU, 1 MU=0.83 newton.metre).

I.2—Rheometry

The measurements are carried out at 150° C. with an oscillating-chamber rheometer according to the standard DIN 53529—Part 3 (June 1983). The variation in rheometric torque as a function of time describes the variation in stiffening of the composition as a result of the vulcanization reaction. The measurements are processed according to the standard DIN 53529—Part 2 (March 1983): $t_i$ is the induction time, i.e. the time needed before the onset of the vulcanization reaction. The first-order conversion rate constant denoted by K (expressed in $min^{-1}$), calculated between 30% and 80% conversion, is also measured, which allows the vulcanization kinetics to be evaluated.

I-3. Tensile Tests

These tests make it possible to determine the elasticity stresses and the properties at break. Unless otherwise indicated, they are carried out in accordance with French standard NF T 46-002 of September 1988. The "nominal" secant moduli (or apparent stresses, in MPa) at 10% elongation (denoted "MA10") and 100% elongation ("MA100") are measured in second elongation (i.e., after an accommodation cycle). All these tensile measurements are carried out under standard temperature (23±2° C.) and hygrometry (50±5% relative humidity) conditions according to French standard NF T 40-101 (December 1979). The breaking stresses (in MPa) and the elongations at break (in %) are also measured, at a temperature of 23° C.

I-4. Permeability

The permeability values are measured using a Mocon Oxtran 2/60 permeability "tester" at 40° C. Cured samples in the form of discs with a predetermined thickness (approximately 0.8 to 1 mm) are fitted to the device and rendered leaktight with vacuum grease. One of the faces of the disc is kept under 10 psi of nitrogen while the other face is kept under 10 psi of oxygen. The increase in the oxygen concentration is monitored using a "Coulox" oxygen detector on the face kept under nitrogen. The oxygen concentration on the face kept under nitrogen which makes it possible to achieve a constant value, used to determine the oxygen permeability, is recorded.

An arbitrary value of 100 is given for the oxygen permeability of the control, a result of less than 100 indicating a reduction in the oxygen permeability and therefore a better impermeability.

II—Detailed Description of the Invention

In the present description, unless expressly indicated otherwise, all the percentages (%) indicated are % by weight. Moreover, any interval of values denoted by the expression "between a and b" represents the range of values extending from more than "a" to less than "b" (that is to say limits a and b excluded) whereas any interval of values denoted by the expression "from a to b" means the range of values extending from "a" to "b" (i.e. including the strict limits a and b).

In the present description, unless expressly indicated otherwise, all the percentages (%) indicated are percentages by weight.

The term "diene" elastomer (or indistinctly rubber) is understood to mean an elastomer resulting at least partly (i.e. a homopolymer or a copolymer) from diene monomer(s) (i.e. monomers bearing two carbon-carbon double bonds, whether conjugated or not).

The abbreviation "phr" stands for parts by weight per hundred parts of elastomer or rubber (of the sum of the elastomers if several elastomers are present).

All the glass transition temperature (Tg) values are measured in a known manner by DSC (differential scanning calorimetry) according to the standard ASTM D3418 (1999), on noncrosslinked elastomers in the dry state (i.e. without extender oil). The microstructure of the elastomers is well known by elastomer suppliers, and can be determined in particular by NMR analysis or IR analysis.

The tire inner liner according to an embodiment of the invention therefore has the essential feature of having a rubber composition comprising at least: predominantly a highly unsaturated diene elastomer, a reinforcing organic filler, graphite, chalk, a plasticizing system comprising a plasticizing hydrocarbon resin, the glass transition temperature, Tg, of which is greater than 20° C. and the softening point of which is less than 170° C., which components will be described in detail hereinbelow.

II.1—Highly Unsaturated Diene Elastomer

The tire inner liner according to an embodiment of the invention therefore has the essential feature of having a rubber composition comprising predominantly a highly unsaturated diene elastomer.

Preferably, the content of diene elastomer is between 70 and 100 phr, preferably between 90 and 100 phr.

According to one embodiment variant of the invention, the rubber composition additionally comprises, in a minority amount, a halogenated or non-halogenated butyl elastomer, the content of butyl elastomer preferably being less than 30 phr.

Diene elastomers may be classified into two categories: "essentially unsaturated" and "essentially saturated". The expression "essentially unsaturated" is understood in general to mean a diene elastomer resulting at least partly from conjugated diene monomers, having a content of units of diene origin (conjugated dienes) that is greater than 15% (mol %); thus, diene elastomers such as butyl rubbers or diene/α-olefin copolymers of EPDM type do not fall under the preceding definition and may be described, in particular, as "essentially saturated diene elastomers" (low or very low content of units of diene origin, always less than 15%). Within the "essentially unsaturated diene elastomer" category, the expression "highly unsaturated diene elastomer" is understood in particular to mean a diene elastomer having a content of units of diene origin (conjugated dienes) that is greater than 50%.

Having given these definitions, it will be understood more particularly that a diene elastomer that can be used in the compositions according to an embodiment of the invention means:

(a)—any homopolymer obtained by polymerizing a conjugated diene monomer having 4 to 12 carbon atoms;

(b)—any copolymer obtained by copolymerizing one or more conjugated dienes with one another or with one or more vinylaromatic compounds having 8 to 20 carbon atoms;

(c)—a ternary copolymer obtained by copolymerizing ethylene, an α-olefin having 3 to 6 carbon atoms and an unconjugated diene monomer having 6 to 12 carbon atoms, such as for example the elastomers obtained from ethylene, propylene and an unconjugated diene monomer of the aforementioned type such as in particular 1,4 hexadiene, ethylidene norbornene and dicyclopentadiene; and (d)—a copolymer of isobutene and isoprene (butyl rubber), and also the halogenated, in particular chlorinated or brominated, versions of this type of copolymer.

Although embodiments of the present invention apply to any type of diene elastomer, a person skilled in the art of tires will understand that it is preferably used with essentially unsaturated diene elastomers, in particular of type (a) or (b) above.

Suitable conjugated dienes are, in particular, 1,3-butadiene, 2-methyl-1,3-butadiene, 2,3-di($C_1$-$C_5$alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Suitable vinylaromatic compounds are, for example, styrene, ortho-, meta- and para-methylstyrene, the commercial "vinyl-toluene" mixture, para-(tert-butyl)styrene, methoxystyrenes, chlorostyrenes, vinylmesitylene, divinylbenzene and vinylnaphthalene.

The copolymers may contain between 99% and 20% by weight of diene units and between 1% and 80% by weight of vinylaromatic units. The elastomers may have any microstructure which depends on the polymerization conditions used, in particular on the presence or absence of a modifying and/or randomizing agent and on the amounts of modifying and/or randomizing agent employed. The elastomers may, for example, be block, random, sequential or microsequential elastomers and may be prepared in dispersion or in solution; they may be coupled and/or star-branched or else functionalized with a coupling and/or star-branching or functionalizing agent. For coupling with carbon black, mention may be made, for example, of functional groups comprising a C—Sn bond or of aminated functional groups, such as benzophenone, for example. Mention may also be made, as other examples of functionalized elastomers, of elastomers (such as SBR, BR, NR or IR) of the epoxidized type.

Polybutadienes are suitable and in particular those having a content (mol %) of 1,2-units of between 4% and 80% or those having a content (mol %) of cis-1,4-units of greater than 80%, polyisoprenes, butadiene-styrene copolymers and in particular those having a glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene-isoprene copolymers and in particular those having an isoprene content of between 5% and 90% by weight and a Tg of −40° C. to −80° C., or isoprene-styrene copolymers and in particular those having a styrene content of between 5% and 50% by weight and a Tg of between −25° C. and −50° C. In the case of butadiene-styrene-isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene-styrene-isoprene copolymer having a Tg of between −20° C. and −70° C., are suitable in particular.

To sum up, the diene elastomer of the composition in accordance with an embodiment of the invention is preferably selected from the group of highly unsaturated diene elastomers consisting of polybutadienes (BRs), synthetic polyisoprenes (IRs), natural rubber (NR), butadiene copolymers, isoprene copolymers and mixtures of these elastomers. Such copolymers are more preferably selected from the group consisting of butadiene-styrene (SBR) copolymers, isoprene-butadiene (BIR) copolymers, isoprene-styrene (SIR) copolymers and isoprene-butadiene-styrene (SBIR) copolymers.

According to one particular embodiment, the diene elastomer is predominantly (i.e. more than 50 phr) an SBR, whether it is an SBR prepared in emulsion ("ESBR") or an SBR prepared in solution ("SSBR"), or an SBR/BR, SBR/NR (or SBR/IR), BR/NR (or BR/IR), or else SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR may advantageously be used as a mixture with a BR preferably having more than 90% (mol %) of cis-1,4-bonds.

According to another particular embodiment, the diene elastomer is predominantly (more than 50 phr) an isoprene elastomer. The expression "isoprene elastomer" is understood, in a known manner, to mean an isoprene homopolymer or copolymer, in other words a diene elastomer selected from the group consisting of natural rubber (NR), synthetic polyisoprenes (IRs), various isoprene copolymers and mixtures of these elastomers. Mention will in particular be made, among isoprene copolymers, of isobutene-isoprene (butyl rubber—IIR-optionally halogenated by Br, Cl, etc.), isoprene-styrene (SIR), isoprene-butadiene (BIR) or isoprene-butadiene-styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferably still of greater than 98%.

According to another particular embodiment, especially when it is intended for an airtight inner liner of a tubeless tire (or other air-impermeable element), the composition in accordance with an embodiment of the invention may contain at least, in a minority amount, one essentially saturated diene elastomer, in particular at least one EPDM copolymer or a butyl rubber (optionally chlorinated or brominated), as a mixture with predominantly highly unsaturated diene elastomers such as mentioned above, especially NR or IR, BR or SBR.

According to another preferred embodiment of the invention, the rubber composition comprises one (or more) "high Tg" diene elastomer exhibiting a Tg of between −70° C. and 0° C. The high Tg elastomer is preferably selected from the group consisting of S-SBRs, E-SBRs, natural rubber, synthetic polyisoprenes (having a content (mol %) of cis-1,4-linkages preferably greater than 95%), BIRs, SIRs, SBIRs and mixtures of these elastomers. More preferably, the rubber composition according to an embodiment of the invention has the feature of comprising, as highly unsaturated diene elastomer, a styrene-butadiene (SBR) copolymer, the glass transition temperature (Tg) of which is greater than −40° C., referred to hereinbelow as "high Tg SBR".

According to another particular embodiment of the invention, the rubber composition comprises a blend of a (one or more) "high Tg" diene elastomer and of a (one or more) "low Tg" diene elastomer exhibiting a Tg of between −110° C. and −80° C., more preferably between −105° C. and −90° C. The low Tg elastomer preferably comprises butadiene units in a content (mol %) at least equal to 70%; it preferably consists of a polybutadiene (BR) having a content (mol %) of cis-1,4-linkages greater than 90%.

According to another particular embodiment of the invention, the rubber composition comprises, for example, from 30 to 100 phr, in particular from 50 to 100 phr, of a high Tg elastomer as a blend with 0 to 70 phr, in particular from 0 to 50 phr, of a low Tg elastomer; according to another example, it comprises, for the whole of the 100 phr, one or more SBR(s).

According to another particular embodiment of the invention, the diene elastomer of the composition according to the invention comprises a blend of a BR (as low Tg elastomer) having a content (mol %) of cis-1,4-linkages greater than 90%, with one or more S-SBRs or E-SBRs (as high Tg elastomer(s)).

The compositions of an embodiment of the invention may contain a single diene elastomer or a mixture of several diene elastomers, it being possible for the diene elastomer(s) to be used in combination with any type of synthetic elastomer other than a diene elastomer, or even with polymers other than elastomers, for example thermoplastic polymers.

Use is preferably made of a high Tg SBR having a styrene content of between 5% and 50% by weight and more particularly of between 20% and 40%, a content of 1,2-bonds of the butadiene part of between 4% and 65%, and a content of trans-1,4-bonds of between 20% and 80%. A person skilled in the art knows how to modify the microstructure of an SBR elastomer in order to adjust its Tg.

According to one particular embodiment of the invention, the rubber composition comprises between 40 and 100 phr, in particular between 50 and 100 phr, of high Tg SBR.

One or more other diene elastomer(s) may be combined with the high Tg SBR above.

The optional additional diene elastomer is preferably selected from the group consisting of polybutadienes (BR), synthetic polyisoprenes (IR), natural rubber (NR), butadiene copolymers, isoprene copolymers (other than IR) and mixtures of these elastomers. Such copolymers are more preferably selected from the group consisting of isoprene-butadiene (BIR) copolymers, isoprene-styrene (SIR) copolymers, and isoprene-butadiene-styrene (SBIR) copolymers.

According to another embodiment of the invention, the composition intended for a tire inner liner may comprise, in a minority amount, one or more butyl rubbers, as a blend with one or more diene elastomers.

The term "butyl rubber" is understood to mean a homopolymer of poly(isobutylene) or a copolymer of poly(isobutylene) with isoprene (in this case, this butyl rubber is included among the diene elastomers) and the halogenated derivatives, in particular generally the brominated or chlorinated derivatives, of these homopolymers of poly(isobutylene) and copolymers of poly(isobutylene) and isoprene.

Mention will be made, as examples of butyl rubber particularly suitable for the implementation of the invention, of: copolymers of isobutylene and isoprene (IIR), bromobutyl rubbers, such as the bromoisobutylene-isoprene (BIIR) copolymer, chlorobutyl rubbers, such as the chloroisobutylene/isoprene (CIIR) copolymer, and isobutylene rubbers.

By extension of the above definition, the name "butyl rubber" will also include copolymers of isobutylene and of styrene derivatives, such as brominated isobutylene-methylstyrene (BIMS) copolymers.

II.2—Reinforcing Organic Filler

Use may be made of any type of reinforcing organic filler known for its abilities to reinforce a rubber composition that can be used for the manufacture of tires, for example an organic filler such as carbon black.

Such a reinforcing filler typically consists of nanoparticles, the mean size (by weight) of which is less than 500 nm, usually between 20 and 200 nm, in particular and preferably between 20 and 150 nm.

Preferably, the content of total reinforcing organic filler is greater than 30 phr, in particular between 30 and 120 phr. Below 20 phr, the cohesion and the mechanical properties of the protective elastomer layer risk being insufficient for certain applications, whilst above 120 phr there is a risk of increasing the hysteresis and therefore the rolling resistance of the tires. For these reasons, the content of total reinforcing filler is more preferably within a range from 30 to 100 phr.

All carbon blacks, in particular the blacks conventionally used in tires or the treads thereof ("tire-grade" blacks), are suitable as carbon blacks. Mention will more particularly be made, among the latter, of the reinforcing carbon blacks of the 100, 200, 300, 600, 700 or 900 series (ASTM grades), such as, for example, the N115, N134, N234, N326, N330, N339, N347, N375, N683, N772 or N990 blacks.

The carbon blacks might, for example, be already incorporated in the isoprene elastomer in the form of a masterbatch (see, for example, applications WO 97/36724 or WO 99/16600).

Mention may be made, as examples of organic fillers other than carbon blacks, of functionalized polyvinyl organic fillers as described in applications WO-A-2006/069792, WO-A-2006/069793, WO-A-2008/003434 and WO-A-2008/003435.

II.3—Filler of Graphite Type

The term "graphite" is understood in general to mean an assembly of non-compact hexagonal sheets of carbon atoms: graphenes. Graphite, a hexagonal crystal system, has a stack of ABAB type where the B plane is translated relative to the A plane; it belongs to the crystal group: P63/mmc space group.

Graphite cannot be considered to be a reinforcing filler within the meaning of the definition specified in section III.2, however it may be considered to be a semi-reinforcing filler in so far as it makes it possible to increase the tensile modulus of a rubber composition into which it is incorporated.

Having given these definitions, a graphite capable of being used in the compositions according to the invention will be understood more particularly to be:

(a) any natural graphite, associated with rocks affected by metamorphism, after separating the impurities accompanying the graphite veins and after milling;

(b) any thermally expandable natural graphite, i.e. one in which a chemical compound in the liquid state, for example an acid, is intercalated between its graphene planes;

(c) any expanded natural graphite, the latter being produced in two stages: intercalation of a chemical compound in the liquid state, for example an acid, between the graphene planes of a natural graphite by chemical treatment and high-temperature expansion; and (d) any synthetic graphite obtained by graphitization of petroleum coke.

The compositions of an embodiment of the invention may contain a single graphite or a mixture of several graphites, thus it is possible to have a blend of natural graphite and/or expanded graphite and/or synthetic graphite.

The graphite as defined above may be morphologically in platy or non-platy form.

Surprisingly, it has been found that graphites with either of these two types of morphology are suitable in the compositions according to the invention; however, graphites having a platy form are preferentially suitable, all the more so when they are oriented so as to have their largest face perpendicular to the gas permeation flux.

The graphite is present in the composition according to the invention in contents ranging from 3 phr to 50 phr, and preferably between 5 and 30 phr.

II.4—Chalk: Non-Reinforcing Filler

The tire inner liner comprises a composition which has the essential feature of comprising chalk as non-reinforcing filler. Preferably, the chalk content is between 3 and 50 phr, more preferably still between 5 and 30 phr.

The chalk is preferably in the form of microparticles, the mean size (by weight) of which is greater than 1 μm. The median size of the chalk microparticles is preferably between 1 and 200 μm, more particularly between 5 and 100 μm.

Below the above minimum values, both for the chalk content and for the size of the chalk microparticles, the targeted technical effect of impermeability of the composition is not obtained; above the maximum values, a degradation of the processing and a reduction in the cohesion of the mixtures are observed.

The chalks known to a person skilled in the art are natural calcium carbonates (chalk) or synthetic calcium carbonates with or without a coating (for example with stearic acid).

As examples of such preferred, and commercially available chalks, mention may be made, for example, of the chalk sold under the name "Omya BLS" by the company Omya.

According to another embodiment, the graphite and the chalk may be used with other inert fillers such as clay particles, bentonite, talc, kaolin, glass microbeads and glass flakes.

II.5—Plasticizing Hydrocarbon Resin

The composition of the tire inner liner according to an embodiment of the invention has another essential feature of having a plasticizing system comprising a hydrocarbon resin, the glass transition temperature, Tg, of which is greater than 20° C. and the softening point of which is less than 170° C.

In a way known to a person skilled in the art, the name "plasticizing resin" is reserved in the present application, by definition, for a compound which is, on the one hand, solid at ambient temperature (23° C.) (in contrast to a liquid plasticizing compound, such as an oil) and, on the other hand, compatible (that is to say, miscible at the level used, typically of greater than 5 phr) with the rubber composition for which it is intended, so as to act as a true diluting agent.

Hydrocarbon resins are polymers well known to a person skilled in the art which are thus miscible by nature in elastomer compositions, when they are additionally described as being "plasticizing".

They have been widely described in the patents or patent applications mentioned in the introduction to the present document and also, for example, in the work entitled "Hydrocarbon Resins" by R. Mildenberg, M. Zander and G. Collin (New York, VCH, 1997, ISBN 3-527-28617-9), Chapter 5 of which is devoted to their applications, in particular in the tire rubber field (5.5. "Rubber Tires and Mechanical Goods").

They may be aliphatic, naphthenic or aromatic or also of the aliphatic/naphthenic/aromatic type, that is to say based on aliphatic and/or naphthenic and/or aromatic monomers. They may be natural or synthetic and may or may not be based on petroleum (if such is the case, also known under the name of petroleum resins). They are preferably exclusively of hydrocarbon nature, that is to say that they comprise only carbon and hydrogen atoms.

Preferably, the plasticizing hydrocarbon resin exhibits at least one, more preferably all, of the following characteristics:
- a number-average molecular weight (Mn) of between 400 and 2000 g/mol;
- a polydispersity index (PI) of less than 3 (reminder: PI=Mw/Mn with Mw the weight-average molecular weight).

More preferably, this plasticizing hydrocarbon resin exhibits at least one, more preferably still all, of the following characteristics:
- a Tg of greater than 30° C.;
- a weight Mn of between 500 and 1500 g/mol;
- a PI index of less than 2.

The glass transition temperature Tg is measured in a known way by DSC (differential scanning calorimetry) according to standard ASTM D3418 (1999) and the softening point is measured according to standard ASTM E-28.

The macrostructure (Mw, Mn and PI) of the hydrocarbon resin is determined by size exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

According to a particularly preferred embodiment, the plasticizing hydrocarbon resin is selected from the group consisting of cyclopentadiene (abbreviated to CPD) or dicyclopentadiene (abbreviated to DCPD) homopolymer or copolymer resins, terpene homopolymer or copolymer resins, $C_5$ fraction homopolymer or copolymer resins and the mixtures of these resins.

Use is preferably made, among the above copolymer resins, of those selected from the group consisting of (D)CPD/vinylaromatic copolymer resins, (D)CPD/terpene copolymer resins, (D)CPD/$C_5$ fraction copolymer resins, terpene/vinylaromatic copolymer resins, $C_5$ fraction/vinylaromatic copolymer resins and the mixtures of these resins.

The term "terpene" combines here, in a known way, α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, a racemate of the dextrorotatory and laevorotatory enantiomers.

Suitable as vinylaromatic monomer are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

According to a more particularly preferred embodiment, the plasticizing hydrocarbon resin is selected from the group consisting of (D)CPD homopolymer resins, (D)CPD/styrene copolymer resins, polylimonene resins, limonene/styrene copolymer resins, limonene/D(CPD) copolymer resins, $C_5$ fraction/styrene copolymer resins, $C_5$ fraction/$C_9$ fraction copolymer resins and the mixtures of these resins.

The preferred resins above are well known to a person skilled in the art and are commercially available, for example sold as regards:
polylimonene resins: by DRT under the name "Dercolyte L120" (Mn=625 g/mol; Mw=1010 g/mol; PI=1.6; Tg=72° C.) or by Arizona under the name "Sylvagum TR7125C" (Mn=630 g/mol; Mw=950 g/mol; PI=1.5; Tg=70° C.);
$C_5$ fraction/vinylaromatic copolymer resins, in particular $C_5$ fraction/styrene or $C_5$ fraction/$C_9$ fraction copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100" or by Exxon under the names "Escorez 2101" and "ECR 373";

limonene/styrene copolymer resins: by DRT under the name "Dercolyte TS 105" from DRT or by Arizona Chemical Company under the names "ZT115LT" and "ZT5100".

The content of hydrocarbon resin is preferably between 2 and 35 phr. Below the minimum indicated, the targeted technical effect can prove to be insufficient while, above the maximum, the tackiness of the compositions in the uncured state, with regard to the mixing devices, can in some cases become totally unacceptable from the industrial viewpoint. The content of hydrocarbon resin is more preferably still between 5 and 25 phr.

The composition of the tire inner liner may additionally comprise a plasticizer that is liquid at 20° C., it is referred to as a "low Tg" plasticizer, that is to say that it has a Tg of less than −20° C., preferably of less than −40° C.

Any extender oil, whether of aromatic or non-aromatic nature, or any liquid plasticizing agent known for its plasticizing properties with respect to diene elastomers, can be used. At room temperature (20° C.), these plasticizers or these oils, which are more or less viscous, are liquids (that is to say, as a reminder, substances having the capability of eventually adopting the form of their container), as opposed, in particular, to plasticizing hydrocarbon resins which are by nature solid at room temperature.

Any extender oil, whether of aromatic or non-aromatic nature, or any liquid plasticizing agent known for its plasticizing properties with respect to diene elastomers, can be used. At room temperature (20° C.), these plasticizers or these oils, which are more or less viscous, are liquids (that is to say, as a reminder, substances having the capability of eventually adopting the form of their container), as opposed, in particular, to plasticizing hydrocarbon resins which are by nature solid at room temperature.

Particularly suitable are the liquid plasticizing agents selected from the group consisting of liquid diene polymers, polyolefin oils, naphthenic oils, paraffinic oils, DAE (distillate aromatic extract) oils, MES (medium extracted solvate) oils, TDAE (treated distillate aromatic extract) oils, RAE (residual aromatic extract) oils, TRAE (treated residual aromatic extract) oils, SRAE (safety residual aromatic extract) oils, mineral oils, vegetable oils, plasticizing ethers, plasticizing esters, plasticizing phosphates, plasticizing sulphonates and the mixtures of these compounds. According to a more preferred embodiment, the liquid plasticizing agent is selected from the group consisting of MES oils, TDAE oils, naphthenic oils, vegetable oils and mixtures of these oils.

According to one preferred embodiment of the invention, the liquid plasticizer, especially petroleum oil, is of non-aromatic type. A liquid plasticizer is described as non-aromatic when it has a content of polycyclic aromatic compounds, determined with the extract in DMSO according to the IP 346 method, of less than 3% by weight, relative to the total weight of the plasticizer. In this regard, use may preferably be made of a liquid plasticizing agent selected from the group consisting of MES oils, TDAE oils, naphthenic oils (of low or high viscosity, in particular hydrogenated or non-hydrogenated), paraffinic oils and mixtures of these oils. Also suitable as petroleum oil are RAE oils, TRAE oils and SRAE oils or the mixtures of these oils, which contain low contents of polycyclic compounds.

According to another particular embodiment, the liquid plasticizer is a terpenic derivative; by way of example, mention may especially be made of the product "Dimarone" from Yasuhara.

Also suitable are the liquid polymers resulting from the polymerization of olefins or dienes, such as for example those selected from the group consisting of polybutenes, polydienes, in particular polybutadienes, polyisoprenes, copolymers of butadiene and isoprene, copolymers of butadiene or isoprene and styrene and mixtures of these liquid polymers. The number-average molecular weight of such liquid polymers is preferably within a range extending from 500 g/mol to 50 000 g/mol, more preferably from 1000 g/mol to 10 000 g/mol. By way of example, mention may especially be made of the "Ricon" products from Sartomer.

According to another preferred embodiment of the invention, the liquid plasticizer is a vegetable oil. Preferably, use is made of an oil selected from the group consisting of linseed oil, safflower oil, soy bean oil, corn oil, cotton seed oil, turnip seed oil, castor oil, tung oil, pine oil, sunflower oil, palm oil, olive oil, coconut oil, groundnut oil, grapeseed oil and mixtures of these oils, in particular a sunflower oil. This vegetable oil, in particular sunflower oil, is more preferably an oil rich in oleic acid, that is to say that the fatty acid (or all of the fatty acids if several are present) from which it is derived comprises oleic acid in a weight fraction at least equal to 60%, more preferably at least equal to 70%, in particular greater than or equal to 80%.

According to another particular embodiment of the invention, the liquid plasticizer is an ether; mention may be made, for example, of polyethylene glycols or polypropylene glycols. Also suitable are the liquid plasticizers selected from the group consisting of plasticizing esters, plasticizing phosphates, plasticizing sulphonates and mixtures of these compounds. The triesters selected from the group consisting of carboxylic acid triesters, phosphoric acid triesters, sulphonic acid triesters and mixtures of these triesters are especially suitable. As examples of plasticizing carboxylic acid esters, mention may especially be made of the compounds selected from the group consisting of trimellitates, pyromellitates, phthalates, 1,2-cyclohexane dicarboxylates, adipates, azelates, sebacates, and glycerol triesters and the mixtures of these compounds. Among the triesters, mention may in particular be made of glycerol triesters, preferably consisting predominantly (of more than 50%, more preferably of more than 80% by weight) of a $C_{18}$ unsaturated fatty acid, that is to say selected from the group consisting of oleic acid, linoleic acid, linolenic acid and the mixtures of these acids; more preferably, whether it is of synthetic or natural origin, the fatty acid used consists of more than 60%, more preferably still of more than 70% by weight of oleic acid; such triesters (trioleates) having a high content of oleic acid, of natural or synthetic origin, are well known, they have been described for example in application WO 02/088238, as plasticizing agents in tire treads. As phosphate plasticizers, mention may be made, for example, of those that contain between 12 and 30 carbon atoms, for example trioctyl phosphate.

II.6—Various Additives

The tire inner liner rubber compositions in accordance with the invention also comprise all or some of the usual additives customarily used in elastomer compositions intended for the manufacture of treads, such as for example pigments, protective agents such as antiozone waxes, chemical antiozonants, antioxidants, plasticizing agents other than those mentioned above, antifatigue agents, reinforcing resins, methylene acceptors (for example phenolic novolac resin) or methylene donors (for example HMT or H3M), a crosslinking system based either on sulphur, or on sulphur donors and/or on peroxide and/or on bismaleimides, vulcanization accelerators or vulcanization activators.

These compositions may also contain, in addition to coupling agents, coupling activators, agents for covering the inorganic fillers or more generally processing aids capable, in a known manner, owing to an improvement in the dispersion of the filler in the rubber matrix and to a lowering of the viscosity of the compositions, of improving their processability in the uncured state, these agents being, for example, hydrolysable silanes such as alkylalkoxysilanes, polyols, polyethers, primary, secondary or tertiary amines, or hydroxylated or hydrolysable polyorganosiloxanes.

II.7—Preparation of the Rubber Compositions

The compositions used in the treads of the tires of the invention may be manufactured in appropriate mixers, using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing such compositions comprises, for example, the following steps:
- thermomechanically kneading (for example in one or more stages) the highly unsaturated diene elastomer with the reinforcing organic filler, the other fillers and the plasticizing system until a maximum temperature of between 110° C. and 190° C. is reached ("non-productive" phase);
- cooling the whole mixture to a temperature of less than 100° C.;
- subsequently incorporating, during a second ("productive") step, a crosslinking system;
- kneading everything up to a maximum temperature of less than 110° C.

By way of example, the non-productive phase is carried out in a single thermomechanical step during which, in a first step, all the base constituents (the highly unsaturated diene elastomer(s), plasticizing system, reinforcing organic filler and the other fillers) are introduced into an appropriate mixer, such as a standard internal mixer, followed, in a second step, for example after kneading for one to two minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system is then incorporated in an external mixer, such as an open mill, maintained at a low temperature (for example between 40° C. and 100° C.). The combined mixture is then mixed (productive phase) for a few minutes, for example between 2 and 15 min.

The actual crosslinking system is preferably based on sulphur and on a primary vulcanization accelerator, in particular an accelerator of sulphenamide type. Added to this vulcanization system, incorporated during the first non-productive phase and/or during the productive phase, are various known secondary accelerators or vulcanization activators such as zinc oxide, stearic acid, guanidine derivatives (in particular diphenylguanidine), etc. The sulphur content is preferably between 0.5 and 3.0 phr, the primary accelerator content is preferably between 0.5 and 5.0 phr.

It is possible to use, as (primary or secondary) accelerator, any compound capable of acting as an accelerator for the vulcanization of diene elastomers in the presence of sulphur, especially accelerators of thiazole type and also derivatives thereof, and accelerators of zinc thiuram and dithiocarbamate type. These accelerators are more preferably selected from the group consisting of 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-(tert-butyl)-2-benzothiazyl sulphenamide (abbreviated to "TBBS"), N-(tert-butyl)-2-benzothiazyl sulphenimide (abbreviated to "TBSI"), zinc dibenzyldithiocarbamate (abbreviated to "ZBEC") and the mixtures of these compounds. Preferably, use is made of a primary accelerator of the sulphenamide type, for example "TBZTD" (tetrabenzylthiuram disulphide).

The final composition thus obtained may then be calendered, for example in the form of a sheet or a slab, especially for laboratory characterization, or else extruded, for example to form a rubber profiled element used for the manufacture of an inner liner.

The invention relates to the tires described above both in the uncured state (i.e. before curing) and in the cured state (i.e. after crosslinking or vulcanization).

III—Exemplary Embodiments of the Invention

III.1—Preparation of the Compositions

The tests below are carried out in the following manner: the highly unsaturated diene elastomer, the reinforcing organic filler, the graphite, the chalk, the plasticizing system and also the various other ingredients with the exception of the vulcanization system, are introduced successively into an internal mixer (final fill ratio: around 70% by volume), the initial vessel temperature of which is around 60° C. Thermomechanical working (non-productive phase) is then carried out in a step which lasts in total approximately 3 to 4 minutes, until a maximum "dropping" temperature of 165° C. is reached.

The mixture thus obtained is recovered and cooled and then sulphur and an accelerator of sulphenamide type are incorporated on a mixer (homofinisher) at 30° C., everything being mixed (productive phase) for an appropriate time (for example between 5 and 12 min). The compositions thus obtained are subsequently extruded in the form of a tire inner liner.

III.2—Tests

The following tests surprisingly demonstrate good impermeability and mechanical properties of tire inner liners for 2-wheeled vehicles (especially motorcycles, bicycles, etc.).

For the requirements of these tests, four tire inner liner rubber compositions were prepared as indicated above, one in accordance with the invention (denoted hereinafter by C.4) and three not in accordance with the invention (control compositions denoted hereinafter by C.1 to C.3). Their formulations (expressed in phr) are presented in the appended Table 1.

All the rubber compositions C.1 to C.4 are based on 70 phr of a styrene-butadiene rubber having a high glass transition temperature, blended with a conventional styrene-butadiene rubber.

Composition C.1 is a conventional control composition, used in tire inner liners, which comprises 80 phr of a reinforcing organic filler and no other filler. Compostions C.2 to C.4 also comprise 80 phr of this same reinforcing filler. Composition C.2 additionally comprises 20 phr of chalk but no graphite, and composition C.3 additionally comprises 15 phr of graphite but no chalk. Only composition C.4 is in accordance with an embodiment of the invention, and comprises both 20 phr of chalk and 15 phr of graphite.

Compositions C.1 to C.4 all comprise a mixture of two plasticizers: a liquid plasticizer of oil type (20 phr of TDAE oil) and 10 phr of a plasticizing hydrocarbon resin ($C_5$ resin).

Their properties before and after curing (vulcanization) have been summarised in the appended Table 2.

It is observed that composition C.4 in accordance with the invention comprising graphite and chalk, has, in the uncured state, a processability equivalent to that of the control compositions C.1 to C.3; furthermore, its rheometric properties are similar to those of compositions C.1 to C.3.

Furthermore, composition C.4 in accordance with the invention has a permeability lower than that of control compositions C.1 and C.2, which is testament to an increase in the impermeability of such a composition. Composition C.4 has a lower permeability than the control composition C.3, which is a composition that already performs very well in this aspect.

Compositions C.3 and C.4, which both comprise graphite, have a stiffness (MA10) greater than that of the control compositions C.1 and C.2 This increase in stiffness is acceptable for a person skilled in the art who designs tires. Composition C.4, comprising both graphite and chalk, has a stiffness equivalent to composition C.3, which comprises only graphite. The addition of chalk to composition C.4 according to the invention does not contribute to increasing the stiffness significantly.

Thus, the composition in accordance with an embodiment of the invention, including graphite and a non-reinforcing filler of chalk type, makes it possible to notably improve the airtightness properties with respect to a control composition (C.3) which comprises only graphite and which already performs very well in this aspect, but also with respect to a control composition conventionally used in tire inner liners (C.2), while maintaining a good level of the stiffness and processability properties as the conventional control compositions.

TABLE 1

| Composition | C.1 | C.2 | C.3 | C.4 |
|---|---|---|---|---|
| SBR1 (1) | 70 | 70 | 70 | 70 |
| SBR2 (2) | 30 | 30 | 30 | 30 |
| Filler (3) | 80 | 80 | 80 | 80 |
| Chalk (4) | — | 20 | — | 20 |
| Graphite (5) | — | — | 15 | 15 |
| Oils (6) | 20 | 20 | 20 | 20 |
| Resin (7) | 10 | 10 | 10 | 10 |
| 6PPD (8) | 1.5 | 1.5 | 1.5 | 1.5 |
| ZnO (9) | 4 | 4 | 4 | 4 |
| Stearic acid (10) | 1 | 1 | 1 | 1 |
| CBS (11) | 0.7 | 0.7 | 0.7 | 0.7 |
| ZBEC (12) | 0.4 | 0.4 | 0.4 | 0.4 |
| DPG (13) | 1 | 1 | 1 | 1 |
| Sulphur | 1 | 1 | 1 | 1 |

(1) SBR (content expressed as dry SBR) with 41% styrene units and 65% butadiene units; with, for the butadiene part, 24% of 1,2- units, 26% of cis-1,4- units and 50% of trans-1,4- units, (Tg = −25° C.);
(2) SBR with 40% styrene units and 56% butadiene units; with, for the butadiene part, 24% of 1,2- units, 26% of cis-1,4- units and 50% of trans-1,4- units (Tg = −30° C.);
(3) Carbon black ("Zeosil 1165 MP" from Rhodia);
(4) Chalk ("CaCO3 ST" from Omya);
(5) Graphite ("Timerx 80 150" from Timcal);
(6) TDAE;
(7) C$_5$ resin;
(8) N-1,3-dimethylbutyl-N-phenylparaphenylenediamine (Santoflex 6-PPD from Flexsys);
(9) Zinc oxide (industrial grade - Umicore);
(10) Stearin ("Pristerene" from Uniquema);
(11) N-dicyclohexyl-2-benzothiazole sulphenamide ("Santocure CBS" from Flexsys);
(12) Zinc dibenzyl dithiocarbamate ("Perkacit ZBEC" from Performance Additives);
(13) DPG = diphenylguanidine ("Perkacit DPG" from Flexsys).

TABLE 2

| Composition | C.1 | C.2 | C.3 | C.4 |
|---|---|---|---|---|
| Properties before curing | | | | |
| Mooney Rheometry | 39 | 43 | 41 | 42 |
| Ti (min) | 6.8 | 6.8 | 7.1 | 6.7 |
| K (min$^{-1}$) | −0.4 | −0.43 | −0.38 | −0.41 |
| Properties after curing | | | | |
| MA10 (MPa) | 2.3 | 2.4 | 3.2 | 3.4 |
| MA100 (MPa) | 0.85 | 0.81 | 1.1 | 1.1 |
| Oxygen permeability | 100 | 100 | 89 | 82 |

The invention claimed is:

1. A tire inner liner having a rubber composition based on at least:
    predominantly a highly unsaturated diene elastomer;
    a reinforcing organic filler;
    graphite;
    chalk; and
    a plasticizing hydrocarbon resin, the glass transition temperature, Tg, of which is greater than 20° C. and the softening point of which is less than 170° C.

2. The inner liner according to claim 1, wherein the highly unsaturated diene elastomer is selected from the group consisting of polybutadienes (BRs), synthetic polyisoprenes (IRs), natural rubber (NR), butadiene copolymers, isoprene copolymers, and mixtures of these elastomers.

3. The inner liner according to claim 2, wherein the diene elastomer is selected from the group consisting of butadiene-styrene (SBR) copolymers, isoprene-butadiene (BIR) copolymers, isoprene-styrene (SIR) copolymers and isoprene-butadiene-styrene (SBIR) copolymers and mixtures of these elastomers.

4. The inner liner according to claim 1, wherein the content of diene elastomer is between 70 and 100 phr.

5. The inner liner according to claim 1, wherein the rubber composition additionally comprises, in a minority amount, a halogenated or non-halogenated butyl elastomer.

6. The inner liner according to claim 1, wherein the diene elastomer is an elastomer having a high glass transition temperature which is greater than −40° C.

7. The inner liner according to claim 1, wherein the reinforcing organic filler comprises carbon black.

8. The inner liner according to claim 7, wherein the content of carbon black is greater than 30 phr.

9. The inner liner according to claim 7, wherein the content of carbon black is between 30 and 120 phr.

10. The inner liner according to claim 1, wherein the plasticizing hydrocarbon resin has a Tg of greater than +30° C.

11. The inner liner according to claim 10, wherein the content of plasticizing hydrocarbon resin is between 2 and 35 phr.

12. The inner liner according to claim 11, wherein the content of plasticizing hydrocarbon resin is between 5 and 25 phr.

13. The inner liner according to claim 10, wherein the plasticizing hydrocarbon resin is selected from the group consisting of cyclopentadiene or dicyclopentadiene homopolymer or copolymer resins, terpene homopolymer or copolymer resins, C$_5$ fraction homopolymer or copolymer resins and the mixtures of theses resins.

14. The inner liner according to claim 13, wherein the copolymer resins are selected from the group consisting of, cyclopentadiene/vinylaromatic copolymer resins, dicyclopentadiene/vinylaromatic copolymer resins, cyclopentadiene/terpene copolymer resins, dicyclopentadiene/terpene copolymer resins, cyclopentadiene/$C_5$ fraction copolymer resins, dicyclopentadiene/$C_5$ fraction copolymer resins, terpene/vinylaromatic copolymer resins, $C_5$ fraction/vinylaromatic copolymer resins and the mixtures of these resins.

15. The inner liner according to claim 13, in which the plasticizing hydrocarbon resin is selected from the group consisting of cyclopentadiene homopolymer resins, dicyclopentadiene homopolymer resins, cyclopentadiene/styrene copolymer resins, dicyclopentadiene/styrene copolymer resins, polylimonene resins, limonene/styrene copolymer resins, limonene/cyclopentadiene copolymer resins, limonene/dicyclopentadiene copolymer resins, $C_5$ fraction/styrene copolymer resins, $C_5$ fraction/$C_9$ fraction copolymer resins and the mixtures of these resins.

16. The inner liner according to claim 1, wherein the graphite is in a platy form.

17. The inner liner according to claim 16, wherein the graphite is a natural graphite.

18. The inner liner according to claim 16, wherein the graphite is an expanded graphite.

19. The inner liner according to claim 16, wherein the graphite is a synthetic graphite.

20. The inner liner according to claim 16, wherein the graphite comprises a blend of natural graphite and/or expanded graphite and/or synthetic graphite.

21. The inner liner according to claim 16, wherein the graphite content is between 3 and 50 phr.

22. The inner liner according to claim 16, wherein the composition contains a blend of several graphites.

23. The inner liner according to claim 1, wherein the composition contains one or more inert fillers.

24. The inner liner according to claim 1, wherein the composition contains a chalk content of between 3 and 50 phr.

25. A tire comprising an inner liner according to claim 1.

* * * * *